May 21, 1963
C. P. HELIN
3,090,152
FISH LURE
Filed May 2, 1960
2 Sheets-Sheet 1
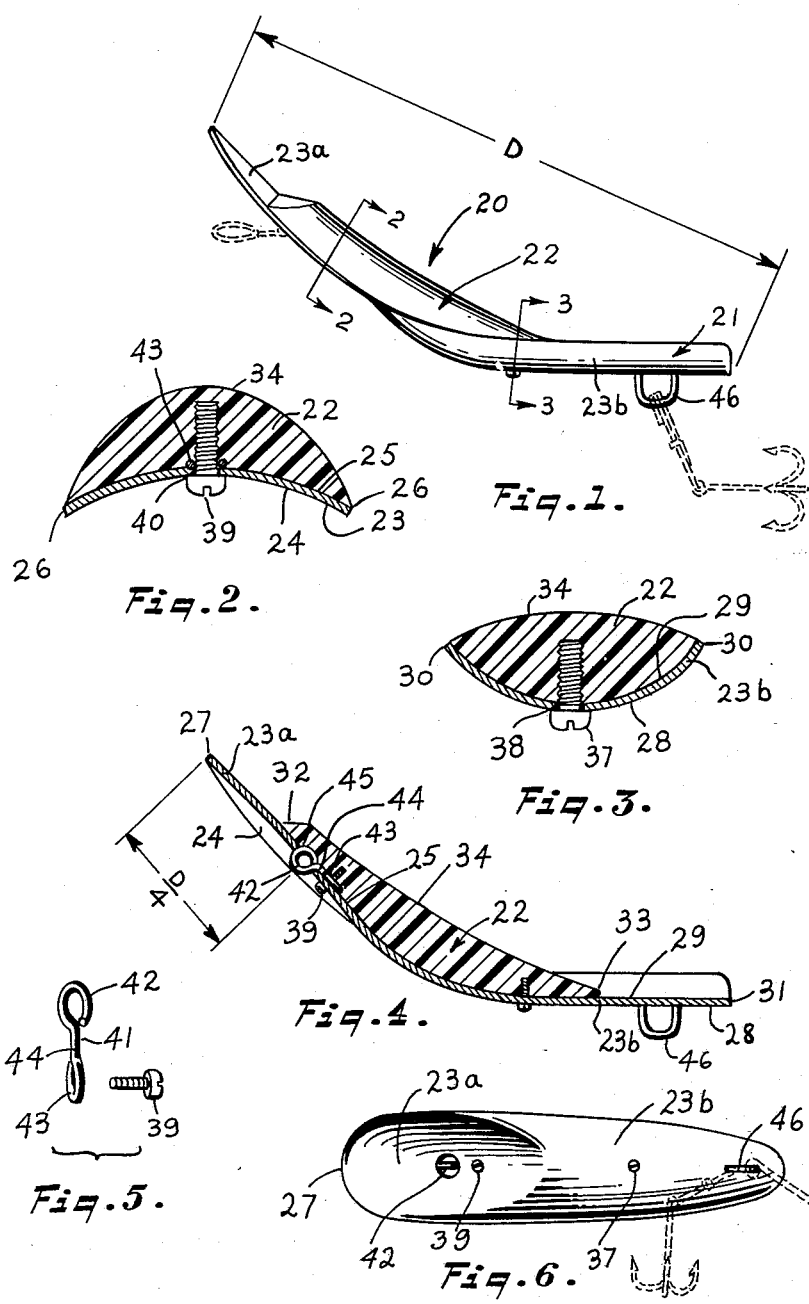
INVENTOR.
CHARLES P. HELIN
BY
Barney, Kinnelly, Rauch & Choate May 21, 1963

C. P. HELIN 3,090,152

FISH LURE

Filed May 2, 1960

INVENTOR.
CHARLES P. HELIN
BY
Barney, Kinnelly, Raisch & Choate

United States Patent Office 3,090,152
Patented May 21, 1963

3,090,152
FISH LURE
Charles P. Helin, 4099 Beaufait,
Grosse Pointe Park, Mich.
Filed May 2, 1960, Ser. No. 26,139
14 Claims. (Cl. 43—42.47)

This invention relates to fish lures and particularly to fish lures of the type which are adapted to operate beneath the surface of the water.

In order to catch fish by utilizing artificial fish lures, such lures should have a swimming or life-like action deceiving the fish into believing that the lures are smaller fish or other living organism.

It is an object of this invention to provide a novel fish lure which moves rapidly laterally as it is pulled through the water changing position transversely with great frequency in relation to its forward progress in the water.

It is a further object of this invention to provide a novel fish lure which has a relatively large number of oscillating movements per unit distance of forward movement through the water compared with prior art fish lures.

It is a further object of this invention to provide a novel fish lure which moves through the water in a predetermined attitude.

In the drawings:

FIG. 1 is a side elevation of the fish lure embodying my invention.

FIG. 2 is a sectional view taken along the line 2—2 in FIG. 1.

FIG. 3 is a sectional view taken along the line 3—3 in FIG. 1.

FIG. 4 is a longitudinal sectional view of the lure.

FIG. 5 is an exploded perspective view of the portion of the lure which provides the means for fastening the fish line.

FIG. 6 is a bottom plan view of the lure.

Figure 7:
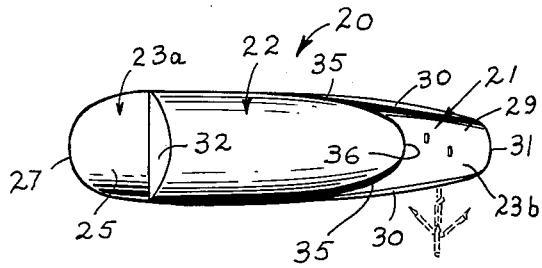
FIG. 7 is a top plan view of the lure.
Figure 8:
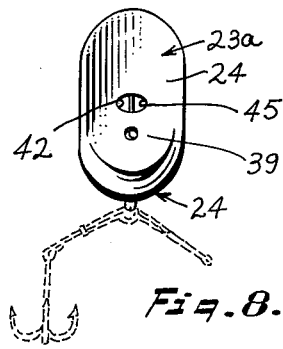
FIG. 8 is a front elevation of the lure.

Referring to FIGS. 1, 4, 6 and 7, the fish lure 20 embodying the invention comprises a first sheet or spoon member 21 and a second body member 22 fastened together as presently described. Sheet member 21 is preferably made of a piece of sheet metal of substantially uniform thickness and comprises a first section 23a extending upwardly and forwardly and a second section 23b extending generally rearwardly and horizontally as the lure is moved through the water. As shown in FIGS. 1 and 4, sections 23a, 23b form an obtuse angle with one another.

Referring to FIG. 2, first section 23 of member 21 is curved in cross section providing a concave under or forward surface 24 and a convex upper or rear surface 25. The side edges 26 of section 23a merge smoothly with the curved forward edge 27 of section 23a.

As shown in FIG. 3, section 23b of member 21 is curved upwardly providing a convex undersurface 28 and a concave upper surface 29. As shown in FIGS. 6 and 7, the edges 30 of section 23b taper rearwardly toward the curved edge 31 of section 23b, the radius of the curve rear edge 31 being less than the radius of the forward edge 27. Body member 22 of lure 20 is preferably made of a material which has a lesser specific gravity than the material of which the member 21 is made and a greater specific gravity than water. Such a material may be plastic. As shown in FIG. 4, body member 22, is positioned on the surfaces 25, 29 of the member 21 generally centrally thereof with the ends 32, 33 of the body member 22 spaced from the edges 27, 31, respectively, of the member 21. Top surface 34 of body member 22 is convex and terminates substantially at the edges 26 of section 23a so that a cross section through the portion of the body member 22 which is adjacent section 23a is crescent shaped as shown in FIG. 2. Similarly, the top surface 34 of body member 22 tapers to the edges 30 of section 23b so that a section taken through the body 22 and section 23b has a configuration such as shown in FIG. 3. As shown in FIG. 7, the side edges 35 of body 22 taper rearwardly and terminate in a curved edge 36. Similarly the surface 34 tapers downwardly to the level of the top surface 29. The front edge 32 of body member 22 is substantially flat and lies in a substantially horizontal plane. By this configuration, the body member has the top surface 34 thereof forming a substantially straight line along the longitudinal center line. The body member 22 is so positioned and shaped that the center of gravity of the body member 22 is forward of the center of gravity of the sheet member 21.

Members 21 and 22 are fastened together by screws. Specifically, a screw 37 extends through an opening 38 in section 23b and is threaded into body member 22.

A screw 39 extends through an opening 40 in section 23a and is threaded into the body member 22.

Means are provided for fastening the leader which is connected to the fish line and comprises an eye member 41 which includes a pair of eyes 42, 43 connected by a straight portion 44. The plane of the eye 42 is at a right angle to the plane of the eye 43. Member 41 is positioned in a groove on the undersurface of the body member 22 before the body member is mounted on the the sheet member 21 with the eye 43 and portion 44 lying in the groove and the eye 42 extending at right angles therefrom. When the body member 22 is then positioned on the sheet member 21, the eye 44 extends through an opening 45 in the section 23a to provide the swivel connection for the leader.

As shown in FIG. 4, the entire portion of the eye 42 lies beneath a line connecting the side edges 26 of the first section 23a. The distance D comprising a straight line between the edges 27, 31 is preferably approximately four times the distance between the edge 27 and the center of the eye 42 (FIGS. 1 and 4).

It can be seen that the eye 44 is spaced rearwardly from the forward edge 27 and is at substantially the mid point of the section 23a.

Means are provided for fastening hooks at a point spaced rearwardly from the rear edge 31 and comprises a U-shaped member 46 the ends of which extend upwardly through openings in the section 23b and are turned over and peened in position. The plane of the U-shaped member 46 extends generally longitudinally of the fish lure. Various arrangements of hooks can be provided but it is desired and preferred that a symmetrical arrangement be used.

Figure 9:
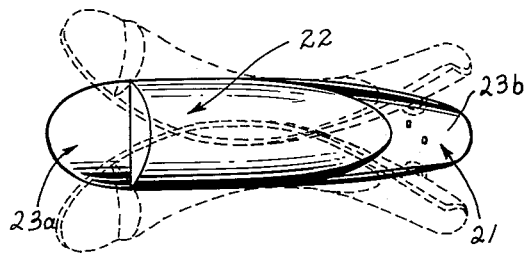
FIG. 9 is a top plan view of the lure showing in dotted lines the manner in which the lure moves as it is pulled through the water.
Figure 10:
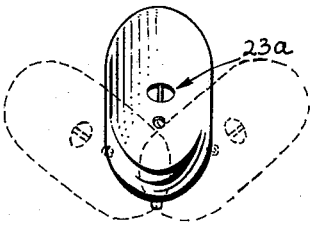
FIG. 10 is a front elevation of the lure showing in dotted lines the appearance of the lure as it moves through the water.

In use, when the fish lure is placed in water and pulled through the water by substantially horizontal force on the eye 42, the pressure of the water against the surface 24 combined with the movement of the water beneath the surface 28 and over the surfaces 32, 34 causes the fish lure to move through the water in a nose-up condition. However, as the fish lure is pulled through the water, it is caused to oscillate back and forth as shown in dotted lines in FIGS. 9 and 10. It can be seen that the movement of section 23a because of its length and arrangement is greater in arcuate distance than the movement of the rear end of section 23b. In addition, as the lure is pulled through the water, it tends to move bodily back and forth so that it does not follow a straight path. The combined oscillating and back and forth movements of the lure occur very rapidly and at a substantial rate per unit distance of movement of the lure through the water. These movements provide a very life-like action to the lure which has proved to deceive fish so that outstanding results are obtained by use of the lure.

The upright or nose-up condition of the fish lure as it is pulled through the water is enhanced by the effect of gravity due to the specific gravity of the metal spoon 21 being greater than the specific gravity of the plastic body member 22. The nose-up condition is further enhanced by the additional weight of the hanger and fish hooks which are heavier than water or plastic. The flow of water over the outer surface of the plastic body member 22 limits the lifting action. The placement of the eye 42 in the concave surface 24 at approximately one fourth the distance to the rear end of the lure produces considerable water resistance.

The rapid oscillating action thus is the result of gravity, high water resistance at the concave section and a minimum lateral resistance due to the streamlined edges.

I claim:

1. A fish lure for use beneath the surface of a body of water comprising a first section extending upwardly and forwardly and a second section extending rearwardly and generally horizontally when the fish lure is pulled beneath the surface of the body of water, the undersurface of said first section being concave, the undersurface of said second section being convex in cross-section, said lure having an intermediate portion thereof connecting said first and second sections, said intermediate portion having an upwardly thickened part and an underlying part, the upper surface of said upwardly thickened part being convex in cross-section, the undersurface of said underlying part merging smoothly with the undersurfaces of said first and second sections, the underlying part having substantially the same specific gravity as said first and second sections, the upwardly thickened part having a specific gravity less than the specific gravity of said underlying part and said first and second sections, said first section having a free forward edge, the forward edge of said first section extending upwardly beyond the uppermost part of said intermediate portion, means for fastening a line to the concave undersurface of said first section at a point spaced rearwardly from the forward edge of said first section only, said second section having a free rear edge, and means for fastening a hook to the convex undersurface of said second section at a point spaced forwardly from the rear edge of said second section.

2. The combination set forth in claim 1 wherein the side edges of each said section taper toward the free edge of the section, the corresponding side edge of said sections gradually merging toward one another.

3. A fish lure adapted for use beneath the surface of a body of water comprising a first member of substantially uniform thickness and a second member mounted on said first member, said second member being made of a material having a specific gravity less than the specific gravity of the material from which said first member is made, said first member having a first section extending upwardly and forwardly and a second section extending generally horizontally when the fish lure is pulled beneath the surface of a body of water, said second member being mounted on the upper surface of said first member in the area of juncture of said front and rear sections of said first member, the undersurface of said first section being generally concave in cross section, the undersurface of said second section of said first member being convex in cross section, said first section having a free front edge and side edges, said second section having a free rear edge and side edges, the upper surface of said second member being generally convex in cross section and terminating adjacent the side edges of said first and second sections of said first member, means on the undersurface of said first section and spaced rearwardly from the front edge of said first section for fastening a fishing line to said lure, and means on the undersurface of said second section and spaced forwardly from the rear edge of said second section for fastening hooks to said lure.

4. The combination set forth in claim 3 wherein the distance between the front and rear edges of said lure is four times the distance between said point of fastening of the fishing line and the forward edge of the lure.

5. The combination set forth in claim 3 wherein said second member has the upper surface thereof defining a substantially straight line along a central longitudinal plane of the lure.

6. The combination set forth in claim 3 wherein the forward edge of said second member is substantially flat and substantially horizontal when the lure is pulled in the water.

7. The combination set forth in claim 3 wherein the center of gravity of said second member is forward of the center of gravity of said first member.

8. The combination set forth in claim 3 wherein said means for fastening a line to said lure comprises an eye fixed to said lure, the plane of said eye extending longitudinally of said lure.

9. The combination set forth in claim 3 wherein the edges of each of said first and second sections taper toward the free end of said section.

10. A fish lure adapted for use beneath the surface of a body of water comprising a first member of substantially uniform thickness and a second member mounted on said first member, said second member being made of a material having a specific gravity less than the specific gravity of the material from which said first member is made, said first member having a first section extending upwardly and forwardly and a second section extending generally horizontally when the fish lure is pulled beneath the surface of a body of water, said second member being mounted on the upper surface of said first member in the area of juncture of said front and rear sections of said first member, the undersurface of said first section being generally concave in cross section, the undersurface of said second section of said first member being convex in cross section, said first section having a free front edge and side edges, said second section having a free rear edge and side edges, the upper surface of said second member being generally convex in cross section and terminating adjacent the side edges of said first and second sections of said first member, means on the undersurface of said first section and spaced rearwardly from the front edge of said first section for fastening a fishing line to said lure, the length of said first section being approximately one-half the straight line distance between the front and rear edges of the first and second section, respectively, said second member having one end thereof terminating at a point spaced rearwardly from the front edge of the first section and the other end thereof terminating at a point spaced forwardly from the rear edge of the second section, and means on the undersurface of said second section and spaced forwardly from the rear edge of said second section for fastening hooks to said lure.

11. The combination set forth in claim 10 wherein the forward edge of said second member is substantially flat and substantially horizontal when the lure is pulled in the water.

12. The combination set forth in claim 1 wherein the undersurface of said second section defines a substantially straight line along a central longitudinal plane of the lure.

13. The combination set forth in claim 3 wherein the undersurface of said second section defines a substantially straight line along a central longitudinal plane of the lure.

14. The combination set forth in claim 11 wherein the undersurface of said second section defines a substantially straight line along a central longitudinal plane of the lure.

References Cited in the file of this patent

UNITED STATES PATENTS

| | | |
|---|---|---|
| 1,345,600 | Keeling | July 6, 1920 |
| 1,490,161 | Dickman | Apr. 15, 1924 |
| 2,107,436 | Flanagan | Feb. 8, 1938 |
| 2,133,032 | Martz | Oct. 11, 1938 |
| 2,525,733 | Suick | Oct. 10, 1950 |
| 2,797,519 | Keller | July 2, 1957 |

FOREIGN PATENTS

| | | |
|---|---|---|
| 470,642 | Canada | Jan. 9, 1951 |
| 513,444 | Canada | June 7, 1955 |